(12) United States Patent
Joergl et al.

(10) Patent No.: US 9,518,479 B2
(45) Date of Patent: Dec. 13, 2016

(54) TURBINE HOUSING OF AN EXHAUST TURBOCHARGER

(75) Inventors: Volker Joergl, Breitenfurt (AT); Sylvia Haller, Mannheim (DE); Harald Roclawski, Rodenbach (DE)

(73) Assignee: BorgWarner Inc., Auburn Hills, MI (US)

( * ) Notice: Subject to any disclaimer, the term of this patent is extended or adjusted under 35 U.S.C. 154(b) by 513 days.

(21) Appl. No.: 14/002,822

(22) PCT Filed: Mar. 8, 2012

(86) PCT No.: PCT/US2012/028166
§ 371 (c)(1),
(2), (4) Date: Sep. 3, 2013

(87) PCT Pub. No.: WO2012/125385
PCT Pub. Date: Sep. 20, 2012

(65) Prior Publication Data
US 2013/0343881 A1    Dec. 26, 2013

(30) Foreign Application Priority Data
Mar. 14, 2011 (DE) .................. 10 2011 013 835

(51) Int. Cl.
*F01D 25/14* (2006.01)
*F02B 39/00* (2006.01)
*F02C 6/12* (2006.01)

(52) U.S. Cl.
CPC ............ *F01D 25/14* (2013.01); *F02B 39/005* (2013.01); *F02C 6/12* (2013.01); *F05D 2220/40* (2013.01)

(58) Field of Classification Search
USPC ......... 415/114, 116, 117, 146, 148, 175, 177
See application file for complete search history.

(56) References Cited

U.S. PATENT DOCUMENTS

| | | | | |
|---|---|---|---|---|
| 2,992,529 A | * | 7/1961 | Sampietro | F02C 7/16 60/728 |
| 7,418,957 B2 | * | 9/2008 | Abe | F02D 41/1494 123/697 |
| 7,946,118 B2 | * | 5/2011 | Hippen | F01M 11/02 184/6.16 |
| 8,342,798 B2 | * | 1/2013 | Floyd, II | F01D 11/24 415/115 |
| 8,733,088 B2 | * | 5/2014 | Reinhart | F01N 3/046 60/280 |

(Continued)

FOREIGN PATENT DOCUMENTS

| | | |
|---|---|---|
| JP | 2004353589 A | 12/2004 |
| JP | 2010048187 A | 3/2010 |

(Continued)

OTHER PUBLICATIONS

International Search Report and Written Opinion : date of mailing , Oct. 16, 2012 ; for International Application No. PCT/US2012/028166 ; 9 pages.

*Primary Examiner* — Binh Q Tran
(74) *Attorney, Agent, or Firm* — BrooksGroup

(57) ABSTRACT

A turbine housing of the exhaust turbocharger, having an inlet, which is adjoined by a spiral; having an outlet; and having a coolant arrangement; wherein the coolant arrangement has a plurality of coolant ducts, which branch off from an inlet duct section and open into an outlet duct section.

11 Claims, 2 Drawing Sheets

(56) References Cited

U.S. PATENT DOCUMENTS

Figure 1:
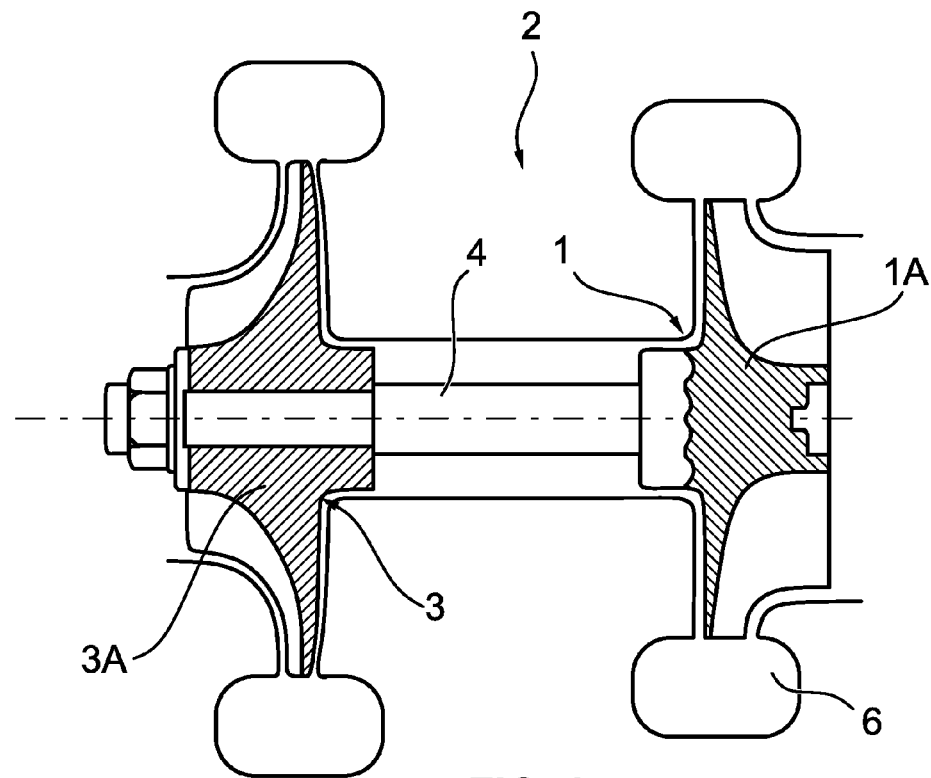

| | | | | |
|---|---|---|---|---|
| 8,826,661 B2* | 9/2014 | Takahata | ........................ | 123/563 |
| 8,888,437 B2* | 11/2014 | Pandey | ................... | F01D 25/12 |
| | | | | 415/1 |
| 2010/0296920 A1 | 11/2010 | Koch | | |
| 2011/0008158 A1 | 1/2011 | Boening et al. | | |

FOREIGN PATENT DOCUMENTS

| | | | | |
|---|---|---|---|---|
| KR | 101088395 | * 12/2011 | .............. | F02B 39/00 |
| KR | 20130063223 A | * 6/2013 | .............. | F01D 25/24 |

* cited by examiner

TURBINE HOUSING OF AN EXHAUST TURBOCHARGER

This application claims the benefit of PCT Application Serial No. 2012/28166 filed Mar. 8, 2012, and German Patent Application Serial No. DE 10 2011013835.8 filed Mar. 14, 2011.

The invention relates to a turbine housing of an exhaust turbocharger in accordance with the preamble of claim 1.

A turbine housing of this kind is known from DE 10 2008 011 257 A1. In this turbine housing, shell elements are secured on the outside of the turbine housing to form a cavity which carries coolant.

Although this type of coolant system in accordance with the disclosure in DE 10 2008 011 257 A1 is intended to make it possible to achieve a simplification in the design and a smaller increase in the weight of the turbine housing over other designs, there is still the problem that the heat input into the turbine housing cannot be reduced but that it is only possible to mitigate the negative effects of this heat input by means of the coolant system. There is furthermore still the problem, especially for use in motor vehicles, that cooled turbine housings necessarily require a larger installation space and, above all, increase the weight of the overall exhaust turbocharger.

It is therefore the object of the present invention to provide a turbine housing of the type stated in the preamble of claim 1, by means of which it is possible to make available a design for ultrahigh power applications while achieving a package of minimum size, a low weight and low production costs.

This object is achieved by the features of claim 1.

By dividing the coolant arrangement into a plurality of coolant ducts which run in the turbine housing and can be supplied separately with coolant, it is first of all possible to achieve selective coolant routing within the turbine housing. This makes it possible to achieve selective adaptation of the coolant flow to the various regions of the turbine housing which are to be cooled, depending on the requirement for cooling. Thus, for example, the region of the wastegate flap, the tongue, the compressor wheel contour region and the region of the wastegate duct can be cooled more intensively, while regions which are heated less can be cooled to only a lesser extent. This applies especially to regions which are provided with thermal insulation devices in many turbine housings.

It is furthermore possible to provide high coolant flow velocities in certain regions, something which is virtually impossible with a cooling jacket, which is used in the turbine housing of the type in question.

The subclaims relate to advantageous developments of the invention.

Figure 2:
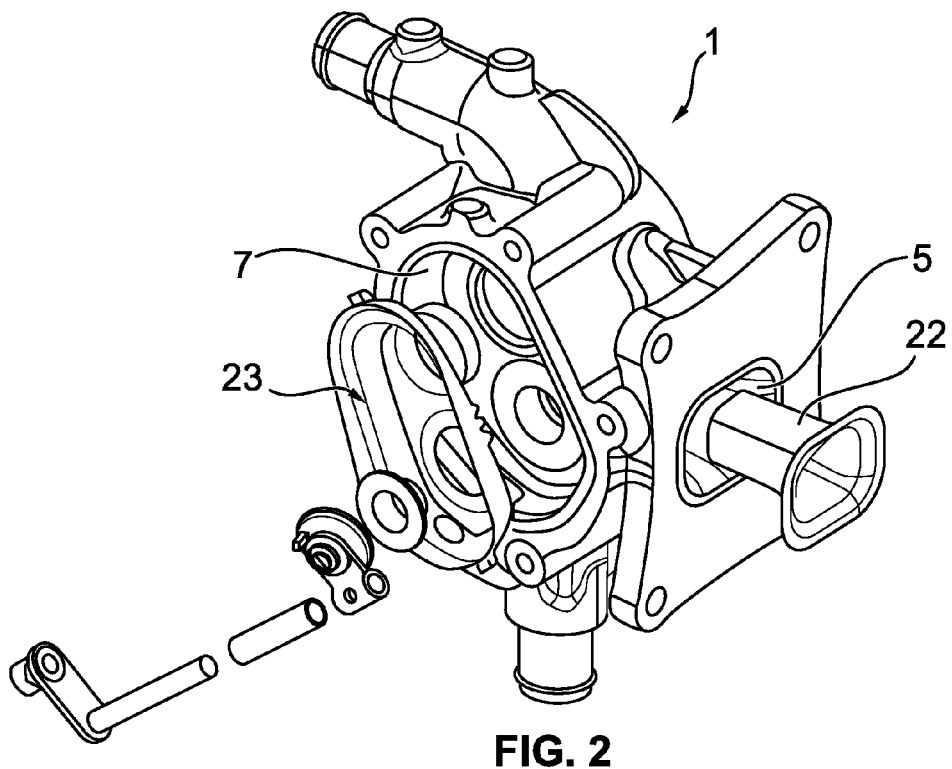
Figure 3:
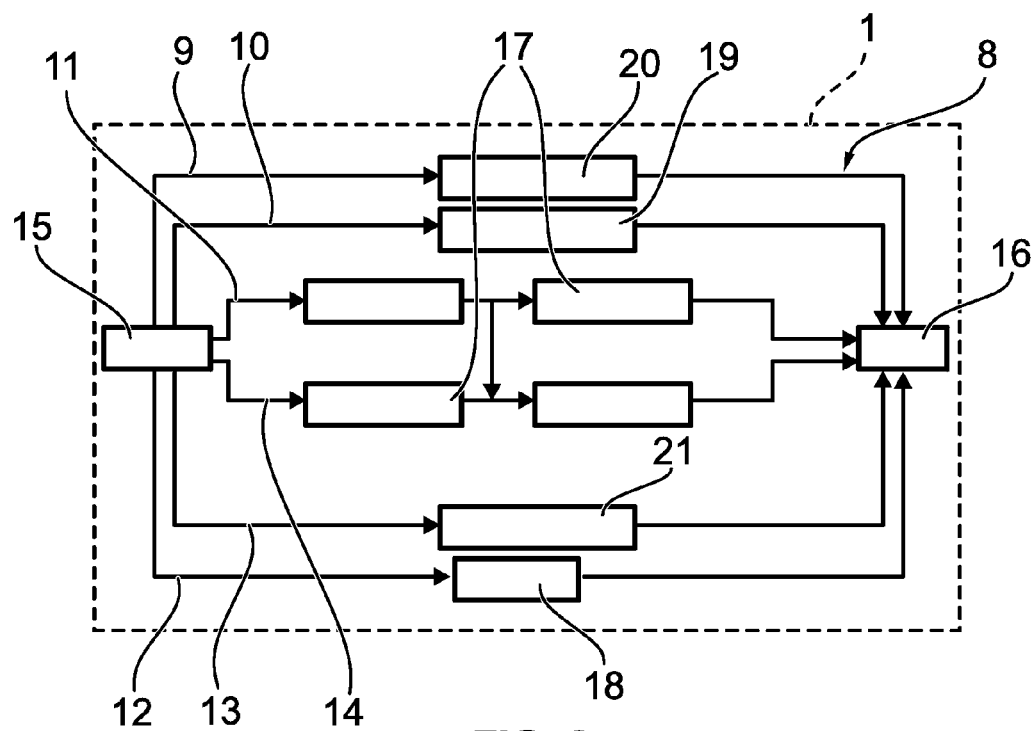
Figure 4:
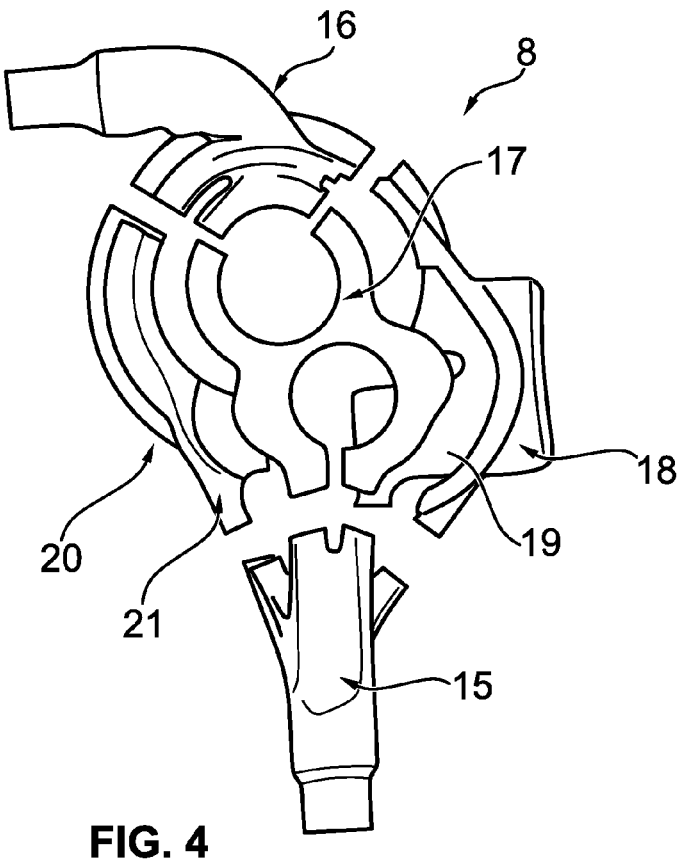

Further details, advantages and features of the present invention will emerge from the following description of embodiments with reference to the drawing, in which:

FIG. 1 shows a schematically highly simplified diagrammatic illustration of a turbocharger in which the turbine housing according to the invention can be used;

FIG. 2 shows a schematically slightly simplified perspective illustration of the turbine housing according to the invention, FIG. 3 shows a schematic diagram intended to illustrate the fundamental construction of the coolant arrangement of the turbine housing according to the invention, and FIG. 4 shows an exploded illustration of a possible practical embodiment of the components of the coolant arrangement shown in FIG. 3.

FIG. 1 shows a turbine housing 1 of an exhaust turbocharger 2 which, in addition to the turbine housing 1, having a turbine wheel 1A and a spiral 6, has a compressor housing 3 having a compressor wheel 3A, as is conventional, wherein the turbine wheel 1A and the compressor wheel 3A are connected to one another by a shaft 4. Of course, a turbocharger 2 of this kind also has all the other customary components, but these are not shown and described since they are not required to explain the principles underlying the present invention.

FIG. 2 shows a perspective illustration of one embodiment of the turbine housing 1 having an inlet 5 and an outlet 7. In this illustration, a coolant arrangement 8 is not visible, but this is described in detail below with reference to FIGS. 3 and 4. However, FIG. 2 illustrates that the inlet 5 and the outlet 7 can be provided with respective heat shields 22 and 23.

When viewed together, FIGS. 3 and 4 reveal the fundamental construction and a possible practical embodiment of the coolant arrangement 8. As FIG. 3 illustrates, the coolant arrangement 8 is divided into a plurality of separate coolant ducts 9 to 14 running within the turbine housing 1, said ducts branching off from an inlet duct section 15 and all of said ducts opening into an outlet duct section 16. The inlet duct section 15 is arranged in the inlet 5, and the outlet duct section 16 is arranged in the outlet 7.

The blocks between the inlet duct section 15 and the outlet duct section 16 symbolize the regions of the turbine housing 1 which are to be supplied with coolant, in particular water, via the coolant lines 9 to 14. The central four blocks 17 are the region of the wheel contour and of the wastegate of the turbine housing 1. Block 18 symbolizes the upper inlet section, and block 19 symbolizes the lower inlet section. Block 20 symbolizes the lower region of the spiral, and block 21 symbolizes the spiral region.

In the practical embodiment, these coolant sections 17 to 21, which can also be understood as integral sections of the coolant line 9 to 14, are of course matched in terms of dimensioning and shape to the turbine housing region to be cooled, as is apparent from the illustration in FIG. 4. FIG. 4 shows an example of a practical embodiment of the turbine housing regions symbolized by said blocks 17 to 21 in FIG. 3, and therefore the corresponding parts are denoted by the same reference signs in FIG. 4 as in FIG. 3. To allow better illustration of the shape and dimensioning of the individual regions 17 to 21, FIG. 4 is an exploded illustration of said regions. All these regions, as well as the inlet and outlet sections 15 and 16, respectively, are of course interconnected in the practical embodiment so as to create flow connections which are at least substantially independent of one another, making it possible also deliberately to supply different quantities of coolant to the individual regions or coolant ducts 9 to 13, depending on the requirement for cooling.

The components 15 to 21 visible in FIG. 4 are cast into the turbine housing 1 (for which purpose appropriately shaped cores are used during casting) and can furthermore be provided with open-loop or closed-loop control devices, such as valves, throttles, orifices or the like to allow selective open-loop or closed-loop control of the coolant flows.

Thus, for example, it is possible to provide less cooling for regions which are exposed to less heat from the exhaust gas. These can, for example, also be regions which, as FIG. 2 shows, are provided with additional heat shields 22 and 23, which reduce the heat input.

Overall, the design according to the invention makes it possible to direct a definable critical minimum proportion of coolant into the regions with a high heat input (contour region, nozzle region ahead of the inlet to the turbine wheel and wastegate region). In the example shown in FIGS. 3 and 4, all these regions are cooled by ducts 11 and 14 and blocks 17.

Overall, it is possible, as stated, to construct the coolant ducts 9 to 14 and the coolant sections 17 to 21 substantially independently of one another, thus enabling the flow through the ducts or regions to be subjected to open-loop or closed-loop control in the desired manner.

Another, preferred possibility is to design the coolant ducts which lead to turbine housing regions with a high heat input in such a way that they have a lower flow resistance than the other ducts. This leads to a natural return of the coolant flow into the regions with a high heat input, i.e. away from the ducts with a higher flow resistance.

It is furthermore possible in this context to supply all the coolant ducts which lead to critical regions with a high heat input with coolant at a significantly higher flow velocity. This, in turn, makes it possible significantly to increase the proportion of coolant for the regions with a high heat input in comparison with the remaining regions or coolant ducts.

The coolant duct or ducts leading to the critical regions with a high heat input can have a significantly higher average heat transfer coefficient between the walls thereof and the coolant in comparison with the remaining ducts. This, in turn, makes it possible for the coolant ducts or coolant regions with a high heat input to have a higher level of heat dissipation than the other regions or ducts. It is possible, for example, to divide the coolant flow in such a way that the coolant duct leading to the critical regions accomplishes at least 40% of the total heat dissipation from all the coolant ducts.

It is furthermore possible to introduce one or more coolant ducts into all the regions with a high heat input. In the case of a plurality of ducts or coolant sections leading to the critical regions of the turbine housing, the possibilities explained above likewise apply.

As already explained with reference to FIG. 2, it is furthermore possible to provide the inlet 5 and the outlet 7, in particular, with heat shields 22 and 23, although these regions too are cooled, the provision of such heat shields 22, 23 resulting in a lower requirement for cooling in the corresponding regions 5 and 7.

Although there is a preference for a coolant arrangement in which all the coolant ducts branch off from the inlet duct section and open into the outlet duct section, it is also possible in principle for one or more other coolant ducts to be provided in the turbine housing in addition to the coolant ducts described above, the other coolant ducts running separately therein.

In addition to the written disclosure of the invention, reference is hereby made explicitly to the graphical illustration thereof in FIGS. 1 to 4.

LIST OF REFERENCE SIGNS

1 turbine housing
1A turbine wheel
2 exhaust turbocharger
3 compressor housing
3A compressor wheel
4 rotor shaft
5 inlet
6 spiral
7 outlet
8 coolant arrangement
9-14 coolant ducts
15 inlet duct section
16 outlet duct section
17-21 coolant sections of the turbine housing 1
22, 23 heat shields

The invention claimed is:

1. A product comprising turbine housing of an exhaust turbocharger comprising an inlet, which is adjoined by a spiral; an outlet; and a coolant arrangement; wherein the coolant arrangement has a plurality of coolant ducts, which at least substantially branch off from an inlet duct section and open into an outlet duct section.

2. The product as set forth in claim 1, wherein the coolant ducts are constructed and arranged to be supplied separately with coolant.

3. The product as set forth in claim 1, wherein the coolant ducts lead to coolant sections which are matched in terms of shape and dimensioning to the respective turbine housing regions to be cooled.

4. The product as set forth in claim 1, wherein the coolant ducts are arranged at least substantially parallel to one another.

5. The product as set forth in claim 1, wherein the coolant ducts can be controlled by means of flow control devices.

6. The product as set forth in claim 5, wherein the control devices are designed as orifices, valves, flaps or the like.

7. The product as set forth in claim 1, wherein the coolant ducts leading to coolant sections with a high heat input have a lower flow resistance than the coolant lines leading to coolant sections with a lower heat input.

8. The product as set forth in claim 1, wherein the inlet is provided with a heat shield.

9. The product as set forth in claim 1, wherein the outlet is provided with a heat shield.

10. The product as set forth in claim 1, wherein the coolant ducts and the coolant sections are cast into the turbine housing.

11. The product as set forth in claim 1, wherein the turbine housing material comprises aluminum.

\* \* \* \* \*